(12) United States Patent
Key et al.

(10) Patent No.: US 11,908,260 B2
(45) Date of Patent: Feb. 20, 2024

(54) SYSTEM FOR AUTHORIZING COMMUNICATION SYSTEM TO CONTROL REMOTE DEVICE

(71) Applicant: GENTEX CORPORATION, Zeeland, MI (US)

(72) Inventors: Kevin J. Key, Holland, MI (US); Thomas D. Klaver, Ada, MI (US); Nicholas J. Goote, Hudsonville, MI (US); Timothy E. Martin, Grand Rapids, MI (US); Todd R. Witkowski, Hudsonville, MI (US); Joshua P. Holtrop, Zeeland, MI (US); Zachary J. Walton, Grand Rapids, MI (US); Jacob K. Walton, Jenison, MI (US); Jason K. Jamieson, Hudsonville, MI (US); Troy A. Redder, Grand Haven, MI (US); Ryan J. Pusztai, Zeeland, MI (US); Carl L. Shearer, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 83 days.

(21) Appl. No.: 17/323,108

(22) Filed: May 18, 2021

(65) Prior Publication Data

US 2021/0358239 A1 Nov. 18, 2021

Related U.S. Application Data

(60) Provisional application No. 63/026,311, filed on May 18, 2020.

(51) Int. Cl.
*G07C 9/00* (2020.01)
*G08C 17/02* (2006.01)
(Continued)

(52) U.S. Cl.
CPC .......... *G07C 9/00896* (2013.01); *E05F 15/77* (2015.01); *G07C 9/00309* (2013.01);
(Continued)

(58) Field of Classification Search
CPC ............ G07C 9/00896; G07C 9/00309; G07C 2009/00388; G07C 2009/00928;
(Continued)

(56) References Cited

U.S. PATENT DOCUMENTS 7,057,494 B2  6/2006  Fitzgibbon
7,741,951 B2  6/2010  Fitzgibbon
(Continued)

FOREIGN PATENT DOCUMENTS

DE    102018100153 A1    7/2018

OTHER PUBLICATIONS

International Search Report dated Aug. 26, 2021, for corresponding PCT application No. PCT/US2021/032861, 3 pages.
(Continued)

*Primary Examiner* — Yong Hang Jiang
(74) *Attorney, Agent, or Firm* — Price Heneveld LLP; Brian James Brewer

(57) ABSTRACT

A control module for a remote device comprises a trainable transmitter configured to communicate a radio frequency signal configured to control the remote device via a first communication protocol. The control module further comprises a communication circuit configured to communicate with a mobile device via a second communication protocol and a user interface comprising at least one user input. The control module comprises a controller configured to communicate the programming information for the remote device with the remote server via the second communication interface and assign the programming information to the at least one user input. The controller is further configured to (Continued)

control the trainable transmitter to output a control signal based on the programming information in response to the at least one user input. The control signal is configured to control the remote device.

13 Claims, 9 Drawing Sheets

(51) Int. Cl.
*H04B 5/00* (2006.01)
*E05F 15/77* (2015.01)
*E05F 15/668* (2015.01)

(52) U.S. Cl.
CPC ........... *G08C 17/02* (2013.01); *H04B 5/0031* (2013.01); *H04B 5/0062* (2013.01); *E05F 15/668* (2015.01); *G07C 2009/00388* (2013.01); *G07C 2009/00928* (2013.01)

(58) Field of Classification Search
CPC ........ E05F 15/77; E05F 15/668; G08C 17/02; H04B 5/0031; H04B 5/0062
See application file for complete search history.

(56) References Cited

U.S. PATENT DOCUMENTS

| 7,786,843 | B2 | 8/2010 | Witkowski |
| 8,536,977 | B2 | 6/2013 | Fitzgibbon |
| 9,984,561 | B1 | 5/2018 | Swafford |
| 2010/0134240 | A1 | 6/2010 | Sims |
| 2015/0228139 | A1* | 8/2015 | Geerlings .......... G07C 9/00309 |
| | | | 340/5.61 |
| 2015/0302732 | A1* | 10/2015 | Wright ............ H04N 21/42204 |
| | | | 340/5.25 |
| 2020/0043270 | A1 | 2/2020 | Cate et al. |

OTHER PUBLICATIONS

Written Opinion dated Aug. 26, 2021, for corresponding PCT application No. PCT/US2021/ 032861, 5 pages.
International Preliminary Report on Patentability dated Nov. 17, 2022, for corresponding PCT application No. PCT/US2021/032861, 6 pages.

* cited by examiner

SYSTEM FOR AUTHORIZING COMMUNICATION SYSTEM TO CONTROL REMOTE DEVICE

CROSS REFERENCE TO RELATED APPLICATIONS

This application claims the benefit of and priority to U.S. Provisional Patent Application No. 63/026,311, filed on May 18, 2020, entitled SYSTEM FOR AUTHORIZING COMMUNICATION SYSTEM TO CONTROL REMOTE DEVICE, the entire disclosure of which is hereby incorporated herein by reference.

TECHNOLOGICAL FIELD

The present invention generally relates to the field of vehicle electronics and more particularly to a transmitter unit for mounting in a vehicle for facilitating communication between the vehicle and a remote electronic system.

SUMMARY OF THE DISCLOSURE

According to one aspect of the present disclosure, a control module for a remote device is disclosed. The control module may comprise a trainable transmitter configured to communicate a radio frequency signal configured to control the remote device via a first communication protocol. The control module further may comprise a communication circuit configured to communicate with a mobile device via a second communication protocol, and a user interface comprising at least one input device. The control module may comprise a controller configured to communicate the programming information for the remote device with the remote server via the second communication interface and assign the programming information to the at least one input device. The controller may further be configured to control the trainable transmitter to output a control signal based on the programming information in response to receipt of a user input on the at least one input device. The control signal may be configured to control the remote device.

The mobile device may be configured to communicate the programming information to the remote server via a third communication interface. The third communication interface may be a wireless communication network in communication with the remote server via an internet gateway. The mobile device may be further configured to communicate the programming information with the communication circuit via a first software application configured to communicate with the control module via the first communication interface. The mobile device may be further configured to communicate the programming information with the remote server via a second software program configured to communicate with remote server via the third communication interface. The mobile device may be further configured to transfer the programming information between the first software application and the second software application on the mobile device. The mobile device may be further configured to identify identifying information of the remote device via at least one of a radio frequency identification (RFID) communication, and a near field communication (NFC). The mobile device may be further configured to identify identifying information of the remote device via image data captured by a camera system of the mobile device. The mobile device may be further configured to communicate the identifying information for the mobile device to the remote server via the third communication interface; and to receive the programming information for the remote device based on the identifying information. The mobile device may be further configured to communicate the identifying information for the mobile device to the remote server via the third communication interface; and to receive the programming information for the remote device based on the identifying information.

The remote device may be configured to broadcast to a localized wireless communication network; and the mobile device may be further configured to receive connection information for the localized wireless communication network via a second software program. The second software program may be configured to communicate with a remote server via the third communication interface, receive the programming information via the localized communication network broadcast from the remote device, and communicate the programming information with the communication circuit via a first software application configured to communicate with the control module via the first communication interface.

According to another aspect, a method of programming a control module for a vehicle to control a remote device may comprise communicating, by a trainable transmitter, a radio frequency signal configured to control the remote device via a first communication protocol; communicating, by a communication circuit, with the mobile device via a second communication protocol; receiving, by a user interface, at least one user input; communicating, by a controller, the programming information for the remote device to a remote server via the second communication interface; assigning, by the controller, the programming information to the at least one user input in response to receiving the programming information; and controlling, by the controller, the trainable transmitter to output a control signal based on the programming information in response to the at least one user input, wherein the control signal may be configured to control the remote device.

The method further may comprise communicating, by the mobile device, the programming information to the remote server via a third communication interface. The third communication interface may be a wireless communication network in communication with the remote server via an internet gateway. The third communication interface may be a wireless communication network in communication with the remote server via an internet gateway. The method further may comprise communicating, by the mobile device, the programming information to the communication circuit via a first software application configured to communicate with the control module via the first communication interface. The method further may comprise communicating, by the mobile device, the programming information to the remote server via a second software program configured to communicate with the remote server via the third communication interface. The method further may comprise transferring, by the mobile device, the programming information between the first software application and the second software application on the mobile device.

The method further may comprise identifying, by the mobile device, identifying information of the remote device via at least one of a radio frequency identification (RFID) communication, a near field communication (NFC), and image data captured by a camera system of the mobile device. The method further may comprise communicating, by the mobile device, identifying information for the mobile device to the remote server via the third communication interface; and receiving, by the mobile device, the programming information for the remote device based on the identifying information. The method further may comprise broadcasting, by the remote device, to a localized wireless communication network, and receiving, by the remote device, connection information for the localized wireless communication network via a second software program, wherein the second software program may be configured to communicate with a remote server via the third communication interface. The method further may comprise receiving, by the remote device, programming information via the localized communication network broadcast from the remote device. The method further may comprise communicating, by the remote device, the programming information with the communication circuit via a first software application configured to communicate with the control module via the first communication interface.

These and other features, advantages, and objects of the present invention will be further understood and appreciated by those skilled in the art by reference to the following specification, claims, and appended drawings.

DETAILED DESCRIPTION

Figure 1:
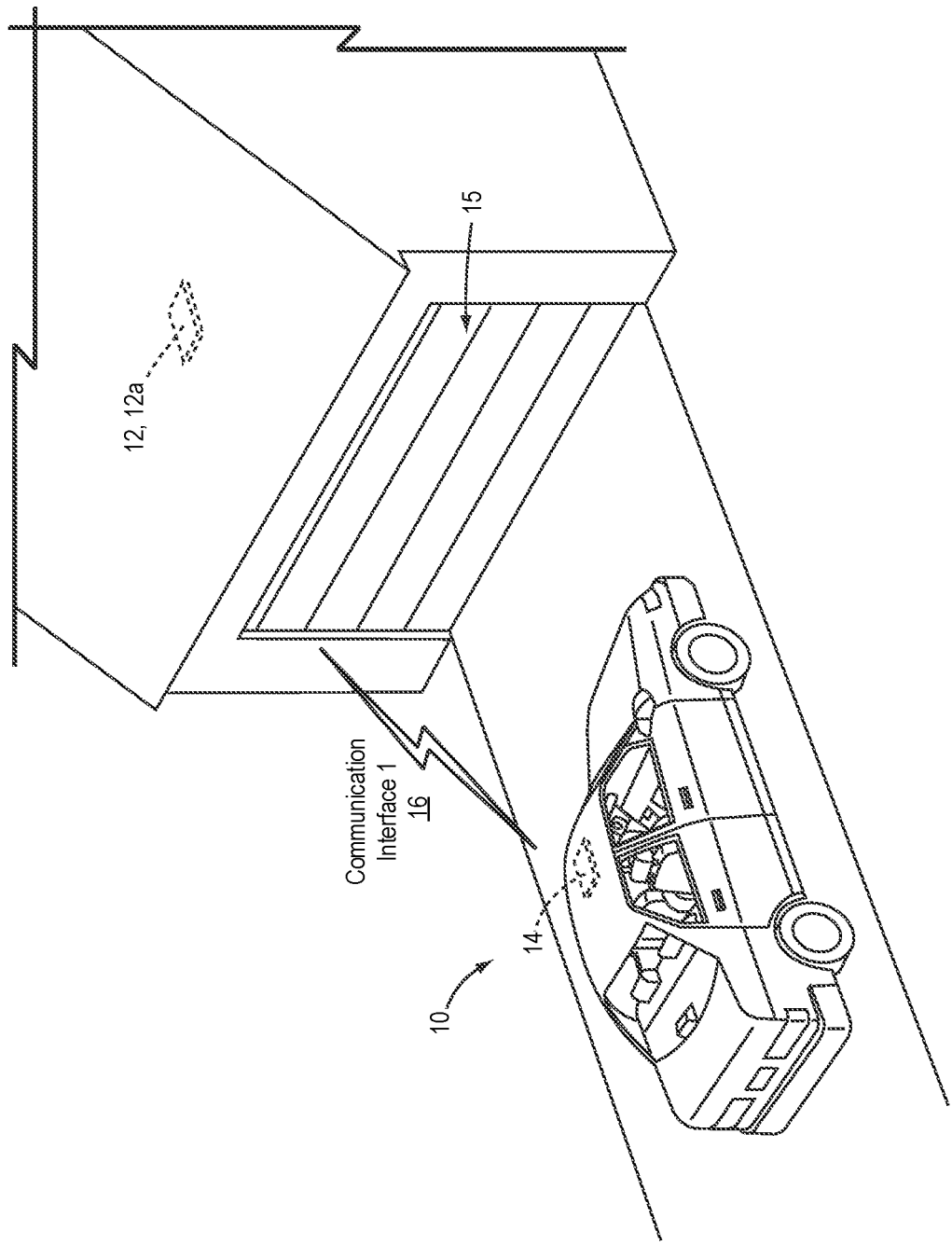
FIG. 1 is a projected view of a communication system for a vehicle.
Figure 2:
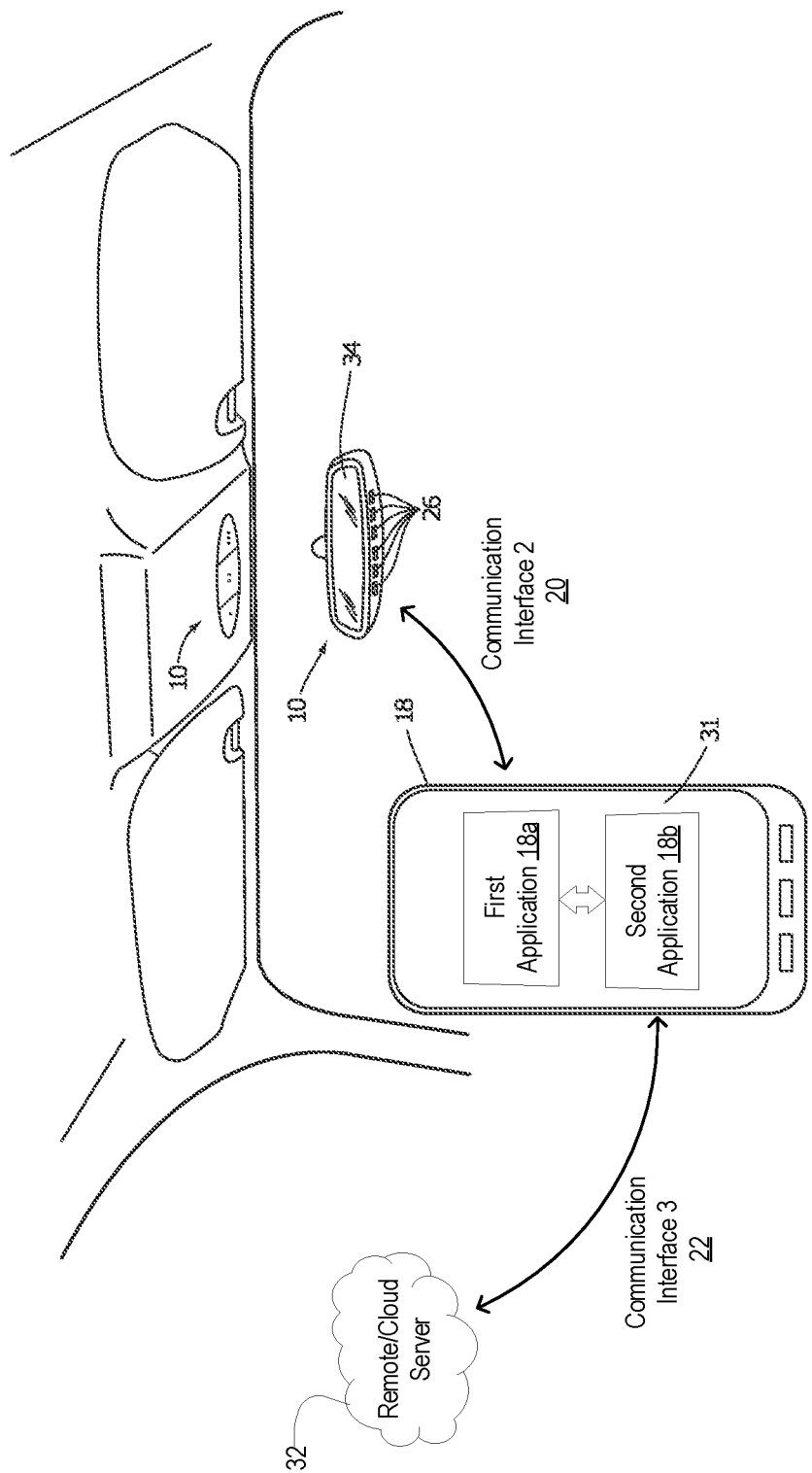
FIG. 2 is a projected view of a communication system for a vehicle.
Figure 3:
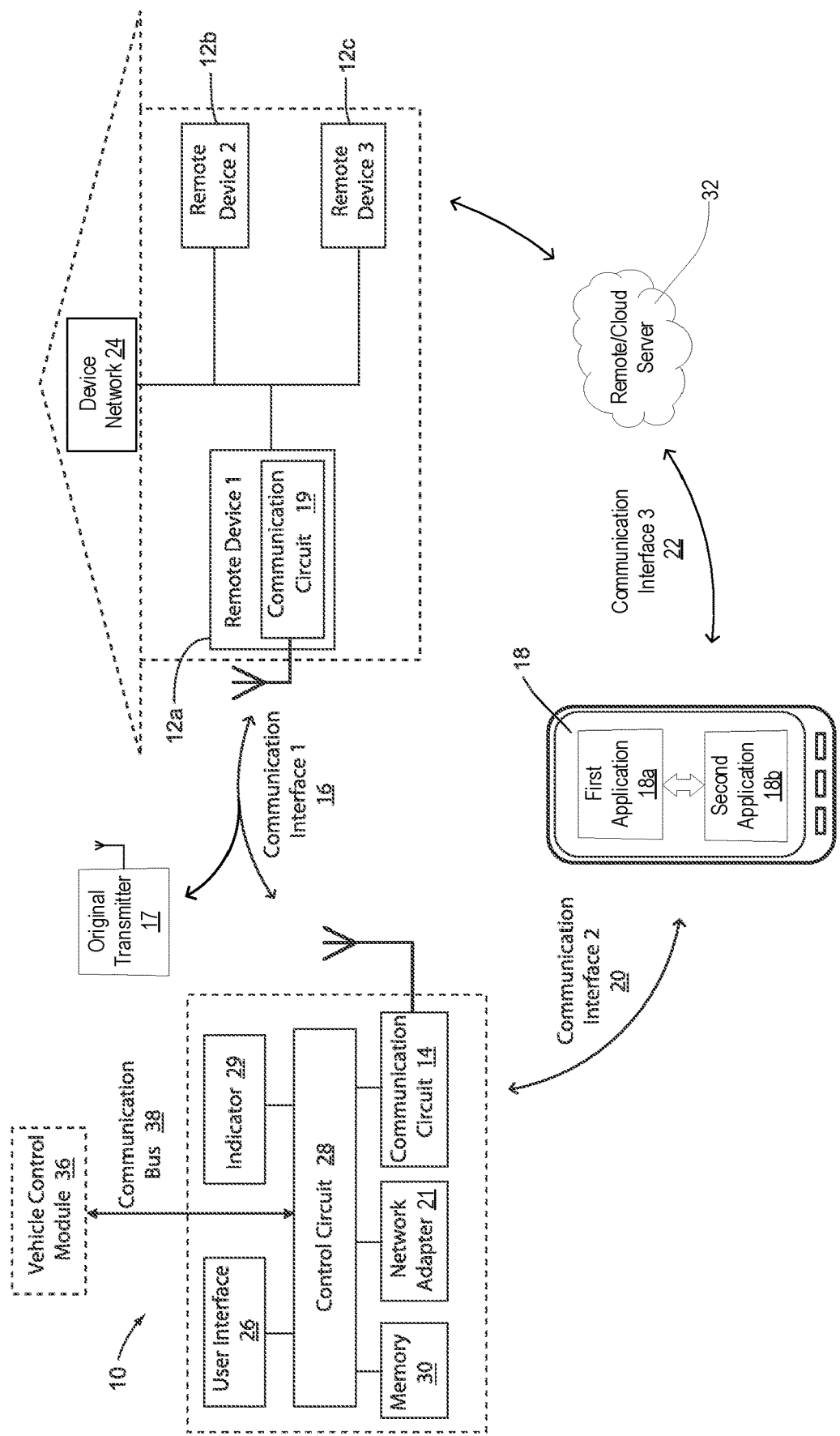
FIG. 3 is block diagram of a communication system demonstrating a plurality of communication interfaces.

Referring to FIGS. 1, 2, and 3, the disclosure provides for a communication system 10 operable to remotely control one or more remote devices 12 (e.g. 12a, 12b, and 12c). The communication system 10 may comprise a communication circuit 14 configured to communicate data and/or signals with the one or more remote devices 12 via a first communication interface 16. In some embodiments, at least one of the remote devices 12 may correspond to a barrier control device 12a, which may be configured to control a position of a garage door 15. Accordingly, the communication circuit 14 may be configured to replace or emulate the operation of an original transmitter 17 or dedicated remote control of the barrier control device 12a or other remote devices 12. In this way, the system may provide for a programmable device that may control a plurality of the remote devices via the first communication interface and/or additional communication interfaces as further discussed herein. Though the barrier control device 12a may be discussed in a variety of examples herein, the barrier control device 12a may generally correspond to a first remote device 12a of the remote devices 12. Accordingly, the barrier control device 12a and the first remote device may be referred to interchangeably to demonstrate the flexibility of the disclosed systems and methods.

In order to emulate the coded communication typically associated with the original transmitter 17, the communication circuit 14 may comprise a transceiver or transmitter that may be configured to communicate with the remote devices 12 via the first communication interface 16. First communication interface 16 may correspond to radio frequency signals associated with the original transmitter 17 including radio frequency signals in the ultra-high frequency range, typically between 260 and 960 megahertz (MHz). In this way, the communication circuit 14 of the system 10 may be configured to control the operation of and/or communicate with various remote devices 12 as illustrated in FIG. 3. For example, the communication circuit 14 may comprise a trainable transceiver (e.g. a HomeLink® trainable transceiver) or a selectively configurable transmitter configured to control at least one of a plurality of remote devices. In this configuration, the communication system 10 may provide for the remote control of at least one remote device.

In general, the disclosure provides for a variety of methods and corresponding apparatus configurations that provide for secure and user-friendly programming of the communication circuit 14 of the system 10. As further discussed in reference to FIGS. 5-9, the application provides for methods that may allow a user to easily program the operation of the communication circuit 14 of the system without physically accessing the barrier control device 12a or other remote devices 12. In this way, the disclosure may provide for various user-friendly options to program the operation of the system 10. It shall be understood that though the disclosure provides for specific examples of communication interfaces, protocols, and similarly enabled devices, the teachings of the disclosure may be applied in various combinations without departing from the spirit of the disclosure.

In the example of remote device 12 corresponding to the barrier control device 12a (e.g., garage, door, or gate opener), the system 10 may be configured to communicate with an application or software program operating on a mobile device 18. In this configuration, the manufacturers of garage door openers and other remote devices 12 may be able to ensure that the setup operation of such devices is easy and accessible. The disclosure provides for methods of automating and assisting a user to train or program the operation of the communication circuit 14 of the system 10 for operation. In some examples, the disclosure may provide for a method to communicate between a first software application 18a configured to configure the operation of the communication circuit 14 of the system and a second software application 18b configured to control and monitor the operation of the remote device 12. In this way, the disclosure may provide for a streamlined configuration method that may be used to train or program the operation of the communication circuit 14 of the system 10 via the mobile device by providing a handshake between the first software application 18a and the second software application 18b operating on the mobile device 18.

In order to fully understand the benefit of the disclosed systems and methods, it may be important to note that each of the first software application 18a and the second software application 18b may require different security access, user information, encrypted communication, and the like, which may be associated with different manufacturers of the system 10 and the barrier control device 12*a*, respectively. Accordingly, by providing for limited information to be shared between the first software application 18*a* and the second software application 18*b*, the disclosure may limit unnecessary communication of user information, passwords, or access to one or more remote servers (e.g. the remote server 32 as later discussed) by software applications that are not directly associated with a manufacturer of a device. In the instant example, a first manufacturer may be associated with the system 10 and the first software application 18*a*, and a second manufacturer may be associated with the barrier control device 12*a* and the second software application 18*b*.

For example, if the first software application 18*a* were granted full access to a remote server of the barrier control device 12*a*, potential security breaches and related vulnerabilities may increase substantially. More generally, if third party applications are granted access to remote servers maintained by the manufacturer, the risk of security breaches expands to the third-party applications. Accordingly, selective communication of programming and enrollment information for the operation of the communication circuit 14 to control the barrier control device 12*a* may be granted without necessarily granting full access and communicating associated user information between the dedicated software applications associated with the system 10 and the barrier control device 12*a*.

In an exemplary implementation, the communication system 10 may further comprise a network adapter 21 configured to provide for communication with mobile device 18 via the second communication interface 20. The network adapter 21 may correspond to a wireless network adapter or any form of communication circuit operable to provide for the second communication interface 20 between the communication system 10 and the mobile device 18. For example, the mobile device 18 may correspond to a smartphone paired with the communication system 10 via network adapters in the form of radio frequency transceivers and/or a protocol such as Bluetooth™ communication. In this configuration, the communication system 10 and the mobile device 18 may exchange information such as status, notifications, activation signals, training information, activation signal parameters, device identification information (e.g., the serial number, make, and/or model of a home electronics device), and/or other information.

In a particular example, the mobile device 18 may be configured to program or configure the operation of the communication circuit 14 via first software application 18*a* and to communicate the programming or training signals communicated with the system 10 via the second communication interface 20. However, programming the operation of the communication circuit 14 to communicate with and control the barrier control device 12*a* may require addition information or the activation of a specialized programming routine of the barrier control device 12*a*. In order to streamline and improve the training or configuration step required to program the communication circuit 14 of the system 10, the first software application 18*a* associated with the system 10 may be configured to communicate with the second software application 18*b* associated with the remote device 12 (e.g., the barrier control device 12*a*). In this way, the disclosure may provide for a user of the communication circuit 14 of the system 10 to communicate programming information or activate a programming mode of the barrier control device 12*a* without requiring a user to interact directly with the barrier control device 12*a*, which may be located in an inconvenient location (e.g. above a vehicle bay of a garage)

In some embodiments, the mobile device 18 may correspond to a mobile communication device (e.g., cell phone, tablet, smartphone, or other communication device). In some embodiments, mobile communication devices may include other mobile electronics devices such as laptops, personal computers, and/or other devices. An exemplary embodiment of the mobile device 18 is discussed further in reference to FIG. 3. In still further embodiments, the communication system 10 may be configured to communicate with networking equipment such as routers, servers, cellular towers, switches, and/or other hardware for enabling network communication. The network may be the internet, an intranet, and/or a cloud computing system architecture.

In some embodiments, the mobile device 18 may further be in communication with the remote devices 12 via a wireless communication circuit, which may correspond to a cellular communication circuit forming a third communication interface 22. In such a configuration, the mobile device 18 may operate as an intermediate communication device. The third communication interface 22 may correspond to a remote network connection, for example, a cellular, network, or cloud-based internet communication interface. In some embodiments, the third communication interface 22 may correspond to various other communication protocols, including but not limited to Bluetooth™, Bluetooth™ low energy (BLE), Wi-Fi (IEEE 802.11), ZigBee, etc. The remote devices 12 may each provide for wireless network connectivity and/or may be in communication with the mobile device 18 via a local device network 24 (e.g. a local Wi-Fi network or device hub). The local device network 24 may be configured to communicate with each of the remote devices wirelessly and/or via one or more wired connections. In this configuration, the mobile device 18 may be configured to communicate with the remote devices via the third communication interface 22 to control one or more features of the remote devices 12.

In the example of the barrier control device 12*a* of the garage door 15, the second software application 18*b* may correspond to a smart home application interface configured to control the operation of the barrier control device 12*a* via the third communication interface 22, which may correspond to a cellular or Wi-Fi communication interface. That is, in some examples, the second software application 18*b* may be a smart home application supplied by a manufacturer of the barrier control device 12*a*. Some examples of manufacturer applications may include, but are not limited to, Aladdin Connect™ for Genie® garage door openers, the myQ® application for Chamberlain® garage door openers, and a variety of smart home applications for similar remote devices 12 as discussed herein. Accordingly, the disclosure provides for an improved method of programming or configuring the operation of the communication circuit 14 of the system by providing a communication interface between the first software application 18*a* and the second software application 18*b* operating on the mobile device 18.

In an exemplary embodiment, the communication system 10 may be operable to send a control signal to the mobile device 18 via the second communication interface 20. The control signal may correspond to a programmable instruction or previously designated command configured to instruct the mobile device 18 to communicate with one of more of the remote devices 12 via the third communication interface 22. For example, in response to an input into an input device of a user interface 26 of the communication system 10, a control circuit 28 of the communication system 10 may send a control signal to the mobile device 18 via the second communication interface 20. In response to receiving the control signal, the mobile device 18 may identify the previously designated or programmed command and communicate the command to at least one of the remote devices 12 via the third communication interface 22.

As discussed herein, the communication system 10 may communicate with at least one remote device 12 via the first communication interface 16, which may be enabled by the communication circuit 14. In some embodiments, the communication system 10 may also be configured to communicate with at least one remote device 12 via the second communication interface 20 and the third communication interface 22. Such communication may be enabled by the network adapter 21 and communication circuitry of the mobile device 18. The communication with remote devices 12 via the network adapter 21 may be referred to as a cloud-based communication, which may incorporate communication via one or more web-based servers. In this configuration, the communication system 10 may be operable to communicate with the remote devices 12 over great distances and outside a range of the communication circuit 14.

Though discussed in reference to the first software application 18a in combination with the second software application 18b, in some implementations, the disclosure may provide for the first software application 18a to communicate with the at least one remote device 12 (e.g. the barrier control device 12a) via the third communication interface 22. In such cases, the first software application 18a may be configured to access the local device network 24 to initiate communication with the remote device 12 via a proprietary discovery or enrollment operation. For example, the first software application 18a may be configured to communicate with a smart home application (e.g. Alexa®, Samsung® Smart Home, Google® Home, Apple® HomeKit, etc.) to discover the barrier control device 12a on the local device network 24. Once discovered and enrolled, the first software application 18a may be configured to communicate with and receive configuration/programming information for the barrier control device 12a or other remote devices 12. Additionally, the first software application 18a may be configured to communicate the programming information to the communication system 10 via the second communication interface 20. In this way, the disclosure may provide for the communication system 10 to communicate with the barrier control device 12a via the mobile device 18 in order to improve a programming and setup operation of the user interface 26 to control the barrier control device via the first communication interface 16.

The remote devices 12 may correspond to various electronic devices, for example, a garage door opener (e.g., barrier control device 12a), a gate opener, lights, security system, door locks, thermostats, electronic devices, and various devices, which may be configured to receive activation signals, control signals, and/or output state information. The remote devices 12 need not be associated with a residence and may include devices associated with businesses, government buildings or locations, or various locales. Remote devices may include mobile computing devices such as mobile phones, smartphones, tablets, laptops, computing hardware in other vehicles, and/or other devices configured to receive activation signals and/or control signals.

Referring now to FIGS. 2 and 3, the communication system 10 may include the user interface 26 in the form of one or more buttons in communication with the control circuit 28. In some embodiments, the user interface 26 may include input devices such as touchscreen displays, switches, microphones, knobs, touch sensors (e.g., projected capacitance sensor, resistance-based touch sensor, resistive touch sensor, or other touch sensor), proximity sensors (e.g., projected capacitance, infrared, ultrasound, infrared, or other proximity sensor), or other hardware configured to generate an input from a user action.

In some embodiments, the communication system 10 may comprise an indicator 29 or display. The indicator 29 may display data to a user or otherwise provide outputs. For example, the indicator 29 may include an indicator light and/or a display screen (e.g., a display as part of a touchscreen, liquid crystal display, e-ink display, plasma display, light emitting diode (LED) display, or other display device), speaker, haptic feedback device (e.g., vibration motor), LEDs, or other hardware component for providing an output. The control circuit 28 may send information and/or control signals or instructions to the indicator 29. For example, the control circuit 28 may send output instructions to the indicator 29 causing the display of an image.

The control circuit 28 may include various types of control circuitry, digital and/or analog, and may include a microprocessor, microcontroller, application-specific integrated circuit (ASIC), graphics processing unit (GPU), or other circuitry configured to perform various input/output, control, analysis, and other functions to be described herein. In other embodiments, the control circuit 28 may be a SoC individually or with additional hardware components described herein. The control circuit 28 may further include memory 30 (e.g., random access memory, read only memory, flash memory, hard disk storage, flash memory storage, solid state drive memory, etc.). In further embodiments, the control circuit 28 may function as a controller for one or more hardware components included in the communication system 10. For example, the control circuit 28 may function as a controller for a touchscreen display or other operator input device, a controller for a transceiver, transmitter, receiver, or other communication device (e.g., implement a Bluetooth™ communications protocol).

In some embodiments, the control circuit 28 may be configured to receive inputs from the user interface 26. The inputs may be converted into control signals that may be identified and utilized to output one or more control signals and/or transmit data via the network adapter 21, the communication circuit 14, a communication bus, and/or any communication circuit. In this configuration, the communication system 10 may communicate (e.g. send and/or receive signals and/or data) to control various remote devices 12. In some embodiments, the communication circuit 14 may be trainable or configurable to replicate the function of one or more original wireless transmitters that may be associated with one or more of the remote devices 12.

The memory 30 may be used to facilitate the functions of the communication system 10 as described herein. Memory 30 may include computer code modules, data, computer instructions, or other information which may be executed by the control circuit 28 or otherwise facilitate the functions of the communication system 10 described herein. For example, memory 30 may include encryption codes, pairing information, identification information, a device registry, etc. Memory 30 and/or the control circuit 28 may facilitate the functions described herein using one or more programming techniques, data manipulation techniques, and/or processing techniques such as using algorithms, routines, lookup tables, arrays, searching, databases, comparisons, instructions, etc.

The communication circuit 14 may correspond to a transceiver circuit or transmitter circuit coupled to the control circuit 28. The transceiver circuit allows the communication system 10 to transmit and/or receive wireless communication signals. The wireless communication signals may be transmitted to or received from a variety of wireless devices (e.g., an original transmitter, home electronic device, mobile communications device, and/or remote device). The communication circuit 14 may be controlled by the control circuit 28. For example, the control circuit 28 may turn on or off the communication circuit 14, send data using the communication circuit 14, format information, communicate an activation signal or control signal, and/or process other signal or data for transmission via the communication circuit 14. Inputs from the communication circuit 14 may also be received by the control circuit 28.

In some embodiments, the communication circuit 14 may include additional hardware such as processors, memory, integrated circuits, antennas, etc. The communication circuit 14 may process information prior to transmission or upon reception and prior to passing the information to the control circuit 28. In some embodiments, the communication circuit 14 may be coupled directly to memory 30 (e.g., to store encryption data, retrieve encryption data, etc.). In further embodiments, the communication circuit 14 may include one or more transceivers, transmitters, receivers, etc. For example, the communication circuit 14 may include an optical transceiver, near field communication (NFC) transceiver, RFID tag reader, Wi-Fi transceiver, etc. In some embodiments, the communication circuit 14 may be implemented as a SoC.

The control circuit 28 may also be coupled to the network adapter 21, receivers, and/or transmitters. In some embodiments, the network adapter 21 may be configured to communicate with the remote devices 12. In some embodiments, the network adapter 21 may be or include a cellular transceiver. In this configuration, the communication system 10 may use the network adapter 21 and/or an additional transceiver (e.g., a cellular transceiver) to access the internet, other networks, and/or network hardware to control the remote devices 12. In some embodiments, the communication system 10 may access the internet, other networks, and/or network hardware through an intermediate device in communication with the communication system 10, such as the mobile device.

In an exemplary embodiment, the network adapter 21 is in communication with the mobile device 18 and is configured to send and/or receive data and/or control signals to the remote devices 12 via the wireless communication circuit of the mobile device 18. The network adapter 21 may communicate with the mobile device 18 via various wireless communication protocols forming the second communication interface 20. For example, communication protocols may include, but are not limited to, wireless protocols (e.g. Bluetooth™, Bluetooth™ low energy (BLE), Wi-Fi (IEEE 802.11), ZigBee, near field communication (NFC), cellular, etc.), a wired interface and/or protocol (e.g., Ethernet, universal serial bus (USB), Firewire, etc.), or other communications connection (e.g. infrared, optical, ultrasound, etc.). In this configuration, the communication system 10 may communicate with the mobile device 18 via the second communication interface 20. In response to the communication from the communication system 10, the mobile device 18 may communicate with the remote devices via the third communication interface 22.

Referring again to FIGS. 2 and 3, the third communication interface 22 may correspond to a wireless or cellular communication interface and in some embodiments, may correspond to a cloud-based communication. As discussed herein, the mobile device 18 may access information or control the operation of the barrier control device 12a via the second software application 18b. That is, the second software application 18b may be configured to communicate with the barrier control device 12a or other remote devices 12 via the third communication interface 22. Additionally, the second software application 18b may access information or control the barrier control device 12a via a remote server 32 in communication with the mobile device 18 via the third communication interface 22. For example, the third communication interface 22 may correspond to a wireless communication interface, such as a wireless or cellular network. Examples of wireless communication that may correspond to the third communication interface 22 may include, but are not limited to, GSM, GPRS, CDMA, EDGE, 3G, 4G, Bluetooth™, Bluetooth™ low energy (BLE), WIFI, WIMAX, LAN, Ethernet, etc. In this configuration, the mobile device may be in communication with one or more of the remote devices 12 and the remote server 32 directly and/or via the local device network 24. Though discussed in reference to the second software application 18b, the first software application 18a operating on the mobile device 18 may similarly be configured to communication with the remote server 32 via the third communication interface.

In some implementations, the mobile device 18 may communicate directly with one or more of the remote devices 12. For example, a remote device may comprise a wireless transceiver configured to communicate with the mobile device 18 via a Bluetooth™, BLE connection, or similar communication protocols presently known or to be developed. The local device network 24 may utilize various networking and/or communication protocols to communicate with the remote devices 12. Such communication may include networking equipment such as routers, servers, cellular towers, switches, and/or other hardware for enabling network communication. The network may be the internet, an intranet, and/or a cloud computing system architecture.

The communication system 10 is shown in communication with the first remote device 12a via the first communication interface 16, which may be formed by the communication circuit 14 and a communication circuit 19 of the first remote device 12a. Similar to the communication circuit 14, the communication circuit 19 may similarly include one or more transceivers, transmitters, receivers, etc. For example, the communication circuit 19 may include an optical transceiver, near field communication (NFC) transceiver, RFID tag reader, Wi-Fi transceiver, etc. In this configuration, the barrier control device 12a or the first remote device 12a may be configured to communicate with the communication circuit 14 of the system and the mobile device 18 via various communication protocols including the communication interfaces 16, 20 and 22 as discussed herein.

In some embodiments, the communication system 10 may further be in communication with one or more of the remote devices 12 via the second communication interface 20 and/or the third communication interface 22. As discussed previously, in an exemplary embodiment, the first remote device 12a may correspond to the barrier control device 12a, such as a garage door opener. In some embodiments, the communication circuit 14 may further be configured to communicate with additional remote devices via the first communication interface 16. For example, the control circuit 28 may be configured to control a fourth remote device and a fifth remote device via the first communication interface 16.

The communication circuit 14 may be configured to transmit and/or learn various activation signals configured to activate a function of the remote devices 12. Activation signals may include control signals, control data, encryption information (e.g., a rolling code, rolling code seed, look-a-head codes, secret key, fixed code, or other information related to an encryption technique), or other information transmitted to a home electronic device and/or remote device. Activation signals may have parameters such as frequency or frequencies of transmission (e.g., channels), encryption information (e.g., a rolling code, fixed code, or other information related to an encryption technique), identification information (e.g., a serial number, make, model or other information identifying a home electronic device, remote device, and/or other device), and/or other information related to formatting an activation signal to control a particular home electronic device and/or remote device.

In some embodiments, the communication circuit 14 may be configured to receive information from one or more electronic devices and/or remote devices 12. The communication circuit 14 may receive information a transceiver and use the transceiver to send activation signals and/or other information to home electronic devices and/or remote devices 12. The transceiver may be configured to send and receive information to and from the remote devices 12. In some embodiments, the communication circuit 14 may correspond to a transmitter configured for one-way communication with a home electronic device and/or remote device (e.g., sending activation signals to the device). The communication circuit 14 may receive information about the home electronic device and/or remote device using additional hardware. The information about the home electronic device and/or remote device may be received from an intermediary device, such as an additional remote device and/or a mobile device 18.

In some embodiments, the communication circuit 14 may be configured to send and/or receive information (e.g., activation signals, control signals, control data, status information, or other information) using a radio frequency signal. For example, the communication circuit 14 may transmit and/or receive radio frequency signals in the ultra-high frequency range, typically between 260 and 960 megahertz (MHz) although other frequencies may be used. In other embodiments, communication circuit 14 may include additional hardware for transmitting and/or receiving signals (e.g., activation signals and/or signals for transmitting and/or receiving other information). For example, the communication circuit 14 may include a light sensor and/or light emitting element (e.g. the indicator 29), a microphone and/or speaker, a cellular transceiver, an infrared transceiver, or other communication device.

The communication system 10 may be trained or otherwise configured to send activation signals and/or other information to a particular device of the remote devices 12. The communication system 10 may also be configured to receive control signals and/or information from the particular device. For example, the communication circuit 14 may be configured to control an opening function of the garage door 15 via the barrier control device 12a (e.g., the first remote device 12a). The control of the barrier control device 12a may be secured via a coded transmission, which may be learned or otherwise programmed into the system 10 via one or more of the methods as later discussed in reference to FIGS. 5-9.

The communication system 10 may be mounted or otherwise attached to a vehicle in a variety of locations. For example, the communication system 10 may be integrated into a dashboard or center stack (e.g., infotainment center), or a headliner of a vehicle. The communication system 10 may be located in other peripheral locations. For example, the communication system 10 may be removably mounted to a visor. The communication system 10 may be mounted to other surfaces of a vehicle (e.g., dashboard, windshield, door panel, bumper, or other vehicle component). For example, a trainable transceiver may be secured with adhesive. In some embodiments, a trainable transceiver may be integrated in a rear view mirror 34 of the vehicle.

Still referring to FIG. 3, the communication system 10 may be in communication with a vehicle control module 36 via a communication bus 38. The connection to the vehicle control module 36 or electronics system may be made using various wired or wireless connections. The connection between the communication system 10 and the vehicle control module 36 may provide for the communication system 10 to access, control, provide outputs to, receive inputs from, and/or otherwise communicate with components of the vehicle. The connection between the communication system 10 and the vehicle control module 36 may provide for the communication system 10 to make use of existing vehicle hardware for use with functions of the communication system 10.

The vehicle control module 36 may include processors (e.g., electronic control units (ECU), engine control modules (ECM), or other vehicle processors), memory, buses (e.g., controller area network (CAN) bus, sensors, on-board diagnostics equipment (e.g., following the (OBD)-II standard or other protocol), cameras, displays, transceivers, infotainment systems, and/or other components integrated with a vehicle's electronics systems or otherwise networked (e.g., a controller area network of vehicle components). For example, the vehicle control module 36 may include, be coupled to, and/or otherwise communicate with a GPS interface. The GPS interface may be configured to receive position information (e.g., from a GPS satellite source). Using the vehicle control module 36, communication bus 38, and/or control circuit 28, the communication system 10 may have access to position information from the GPS interface (e.g., GPS coordinates corresponding to the current location of the vehicle).

Figure 4:
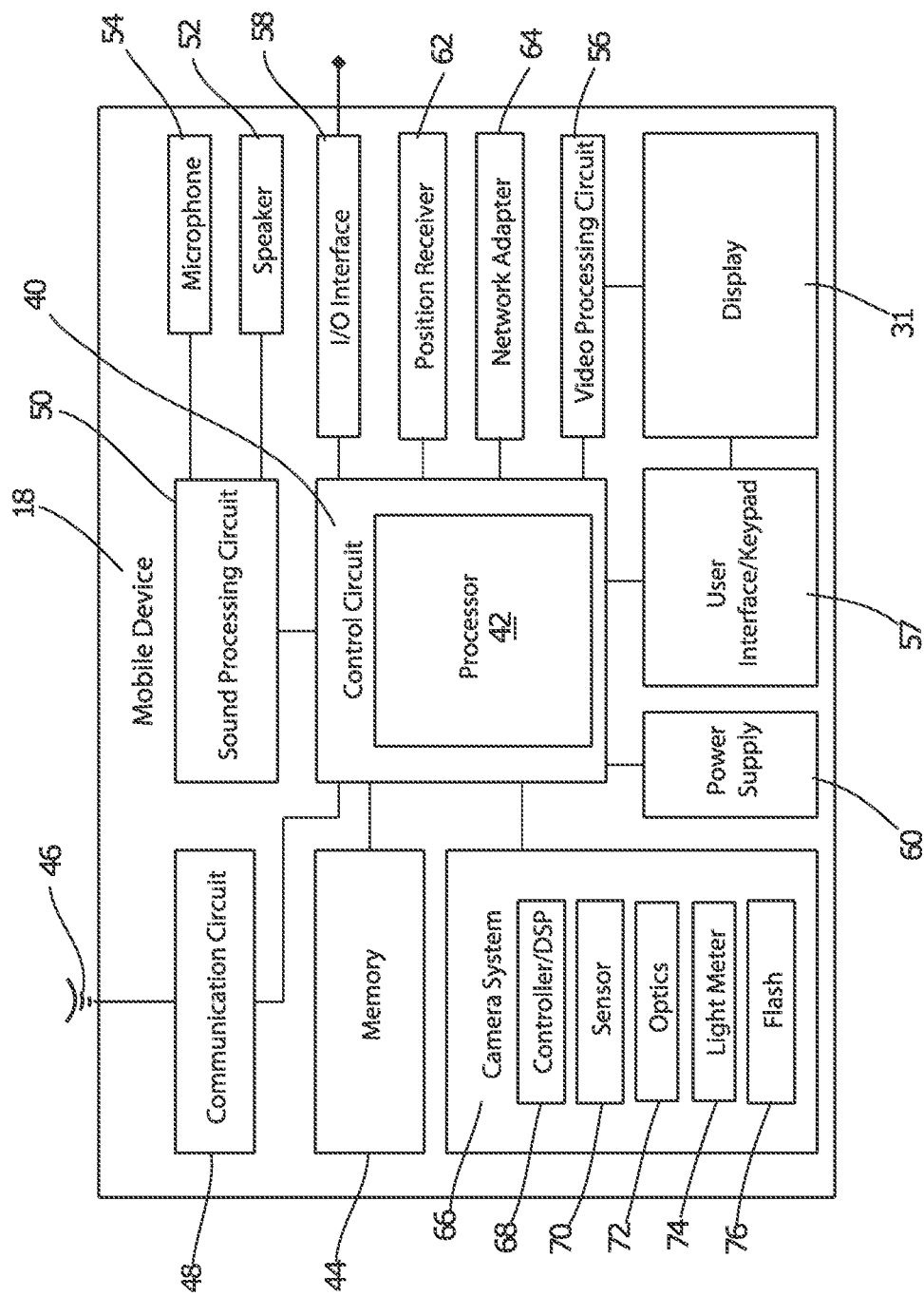
FIG. 4 is a block diagram of an exemplary embodiment of a mobile device, which may be in communication with the communication system.

Referring now to FIG. 4, a block diagram of an exemplary embodiment of the mobile device is shown. The mobile device 18 may comprise a primary control circuit 40 that is configured to control the functions and operations of the mobile device 18. The control circuit 40 may include a processor 42, such as a CPU, microcontroller or microprocessor. The processor 42 executes code stored in a memory (not shown) within the control circuit 40 and/or in a separate memory, such as the memory 44, in order to carry out various operations of the mobile device 18. The memory 44 may be, for example, one or more of a buffer, a flash memory, a hard drive, a removable media, a volatile memory, a non-volatile memory or other suitable devices. Accordingly, the mobile device may be configured to perform a variety of processing routines and access information, such that the first software application 18a and the second software application 18b may each be operated and information may be exchanged between the first software application 18a and the second software application 18b.

The mobile device 18 may also include an antenna 46 coupled to a wireless communication circuit 48. The communication circuit 48 may include a radio frequency transmitter and receiver for transmitting and receiving signals via the antenna 46. The radio signals may be configured to transmit data and may correspond to various communications protocols. The communication circuit 48 may be configured to operate in a mobile communications system and may be used to send and receive data and/or audiovisual content. Receiver types for interaction with a mobile radio network and/or wireless broadcast network may include GSM, CDMA, WCDMA, GPRS, MBMS, Wi-Fi, WiMAX, DVB-H, ISDB-T, etc., as well as advanced versions of these standards that may be developed at a later time. In some embodiments, the communication circuit 48 may include one or more receiver types that may provide communication over various ranges that may be configured to communicate directly or indirectly with the remote devices 12. For example, the communication circuit 48 may be configured to communicate via a variety of wireless standards including, but not limited to, Bluetooth™, BLE connection, LoRa®, SigFox®, and various standards that may be developed in the future.

The mobile device 18 may further include a sound signal processing circuit 50 for processing audio signals transmitted by and received from the communication circuit 48. Coupled to the sound processing circuit 50 may be a speaker 52 and a microphone 54 that enable a user to listen and speak via the mobile device 18. The display 31 may be coupled to the control circuit 40 by a video processing circuit 56 that converts video data to a video signal used to drive the display 31. The mobile device 18 may further comprise a user interface 57 or keypad in communication with the control circuit 40. The user interface 57 may further function in connection with the display 31 to provide for a touch-screen user interface configuration. The mobile device 18 may further include one or more I/O interfaces 58, which may be configured to charge a battery of a power supply 60 and/or for the exchange of data.

The mobile device 18 also may include a position data receiver 62, such as a global positioning system (GPS) receiver. The mobile device 18 also may include a network adapter 64, such as an infrared transceiver and/or an RF adapter or transceiver (e.g., a Bluetooth™ adapter or transceiver). The network adapter 64 may be configured to communicate with the network adapter 21 of the communication system 10 to form the second communication interface 20. In this configuration, the mobile device 18 and the communication system 10 may be configured to communicate various forms of information and data.

For example, the communication system 10 may be configured to send instructions to the mobile device 18 via the second communication interface 20. The instructions from the communication system 10 may be sent in response to the receipt of an input at the user interface 26. In response to the input, the communication system 10 may instruct the mobile device 18 to request a status and/or control one or more of the remote devices 12 via the third communication interface 22. In this configuration, the communication system 10 may utilize the communication enabled between the mobile device 18 and at least one of the remote devices 12 to control and/or identify a status of the remote devices 12.

In some embodiments, the communication system 10 may also be configured to receive programming information, such as software or firmware updates for the communication system 10 from the mobile device 18. The communication system 10 may also receive programming codes or instructions for the communication circuit 14 from the mobile device 18. The communication system 10 may be configured to receive one or more communication codes or protocols associated with a remote device 12 (e.g., the first remote device 12a) from the mobile device 18. In general, the communication system may request and/or receive any form of information that may be utilized in the operation of the communication system 10 from the mobile device 18.

The mobile device 18 may access information for the communication system 10 from the remote server 32 via the third communication interface 22. For example, the mobile device 18 may identify or receive model information identifying a specific control scheme of a particular remote device (e.g., the barrier control device 12a) of the remote devices 12. The mobile device 18 may receive and/or transmit information identifying or training the control frequencies and codes of the particular remote device to the communication system 10 via the second communication interface 20. In this way, the mobile device 18 may be configured to communicate training information to the communication system 10, such that the communication system 10 may receive and store information to control various remote devices 12.

The mobile device 18 may further be coupled to a camera system 66 including a controller 68, such as a digital signal processor (DSP). The functions of the controller 68 may be controlled by the control circuit 40. The camera system 66 may further include a sensor 70 (e.g., a charge-coupled device or CCD) to image a field of view as determined by imaging optics 72 of the camera system 66. A light meter 74 may detect illumination conditions in the field of view and a flash 76 may provide supplemental illumination during the capture of image data.

Referring generally to FIGS. 5-9, various methods of programming the communication circuit 14 of the system 10 are discussed in reference to the operation of the barrier control device 12a. However, the methods described herein may be applied to various remote devices 12. In general, the methods discussed in reference to FIGS. 5-9 may provide for an improved user experience that may limit difficulties and errors associated with programming the operation of the communication circuit 14 of the system 10. Accordingly, the disclosure may provide for various user-friendly options to program the operation of the system 10. It shall be understood that though the disclosure provides for specific examples of communication interfaces, protocols, and similarly enabled devices, the teachings of the disclosure may be applied in various combinations without departing from the spirit of the disclosure.

Referring again to FIGS. 1 and 2, the methods discussed herein may similarly utilize communication or the exchange of data between the first software application 18a and the second software application 18b, each of which may operate on the mobile device 18. As previously discussed, the first software application 18a may provide a user-friendly interface to configured to setup, train, or otherwise program the operation of the communication circuit 14 of the system 10 to control the remote device 12 (e.g., the barrier control device 12a). The first software application 18a may be configured to communicate with the system 10 via the second communication interface 20, which may correspond to a Bluetooth™ communication interface or other wireless communication protocols. In this configuration, the first software application 18a may be utilized on the mobile device 18 to program the operation of the communication circuit 14 of the system 10. However, in many instances, the information required to successfully program the communication circuit 14 requires security information (e.g., a roll count, code sequence, etc.) that may require activating a specialized training mode of the barrier control device 12a.

In order to access the security information required to program the communication circuit 14 to control the barrier control device 12a, the first software application 18a may be configured to exchange or access secure information from the second software application 18b. As previously discussed, the second software application 18b may be configured to control and monitor the operation of the remote device 12 via the third communication interface 22. Additionally, the second software application 18b may be enabled to securely access the remote server 32 or remotely access the barrier control device 12a in order to access or identify the security information required to program the operation of the communication circuit 14. Once accessed, the security or programming information for the barrier control device 12a may be communicated from the second software application 18b to the first software application 18a on the mobile device 18. As discussed herein, communicated between the applications 18a and 18b may correspond to shared or accessible memory location or file that may be updated to communicate the security or enrollment information to program the communication circuit 14 to control the barrier control device 12a. In this way, the disclosure may provide for a streamlined configuration method that may be used to train or program the operation of the communication circuit 14 of the system 10 via the mobile device by providing a handshake between the first software application 18a and the second software application 18b operating on the mobile device 18.

Figure 5:
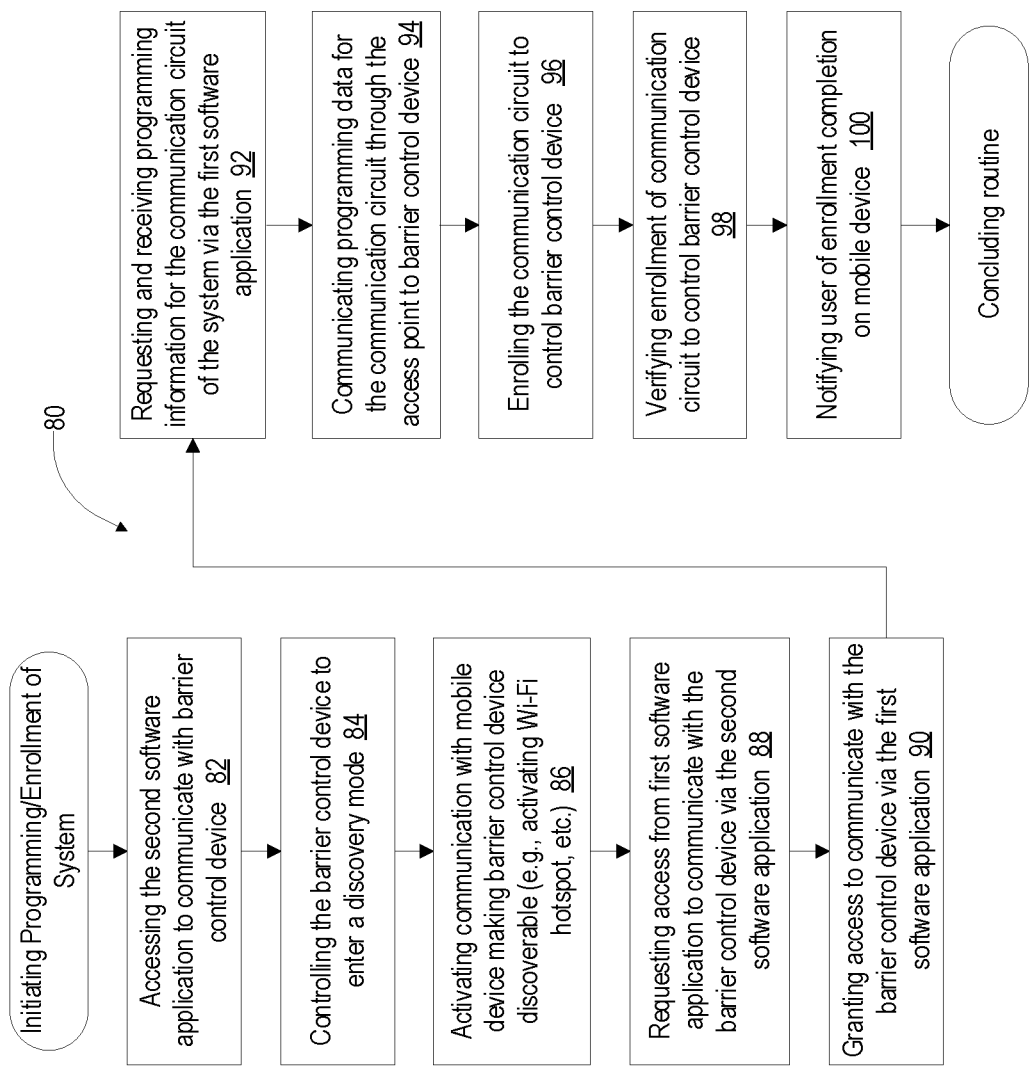
FIG. 5 is a flow chart demonstrating a method of programming an operation of a communication system to control a remote device.

FIG. 5 demonstrates a flow chart demonstrating a method 80 for programming the operation of the communication circuit 14 for operation of the system 10. The method 80 is discussed in reference to FIGS. 2, 3, and 5 for clarity. As previously discussed, the communication circuit of the barrier control device 12a may be configured to communicate via various wireless communication protocols. Accordingly, the method 80 may begin by utilizing the second software application 18b to communicate with the barrier control device 12a (82). As previously discussed, the mobile device 18 may be configured to communicate with the barrier control device 12a via the third communication interface 22, which may correspond to a Wi-Fi or cellular communication protocol. The communication from the second software application 18b via the mobile device 18 may activate a discovery mode of the barrier control device 12a (84). In response to the discovery mode, the barrier control device 12a may be configured to be discoverable via the local device network 24 to which the mobile device 18 may already be connected and in in communication with the barrier control device 12a via the second software application 18b. Similarly, in response to the discovery mode, the barrier control device 12a may activate a local wireless hotspot (e.g. a Wi-Fi hotspot) of the communication circuit 19. Accordingly, the mobile device 18 may access the local wireless hotspot or the local device network 24 via the third communication interface 22 (86).

Following the activation of the discovery mode of the barrier control device 12a, the first software application 18a may request access from the second software application 18b to communicate with the barrier control device 12a via the local device network 24 or the local wireless hotspot broadcast from the communication circuit 19 (88). The request may be displayed as a prompt for access on the display 31 of the mobile device 18. If the access is allowed or granted via the user interface 57, the second software application 18b may grant access to the first software application 18a to communicate with the barrier control device 12a via the access point provided via local device network 24 or the wireless hotspot (90). Once connected and in communication with the barrier control device 12, the first software application 18a may request programming information from the communication circuit 14 of the system 10 via the second communication interface 20 (92). In response to the request, the first software application 18a may communicate the programming data for the communication circuit 14 of the system 10 through the access point to the barrier control device 12a (94).

Following the receipt of the programming data, the barrier control device 12a may enroll the communication circuit 14 of the system 10 to control the operation of the barrier control device 12a to open or close the garage door 15 via the first communication interface 16 (96). The enrollment may then be verified by communicating a verification back to first software application 18a via the third communication interface 22 via the access point or via the second software application 18b (98). Following the receipt of the verification, the first software application 18a may indicate that the communication circuit 14 of the system 10 is configured to control the operation of the barrier control device 12a via the first communication interface 16 and prompt a user to control the operation of the system 10 via the user interface 26 (100). Following step 100, the method 80 may conclude.

Figure 6:
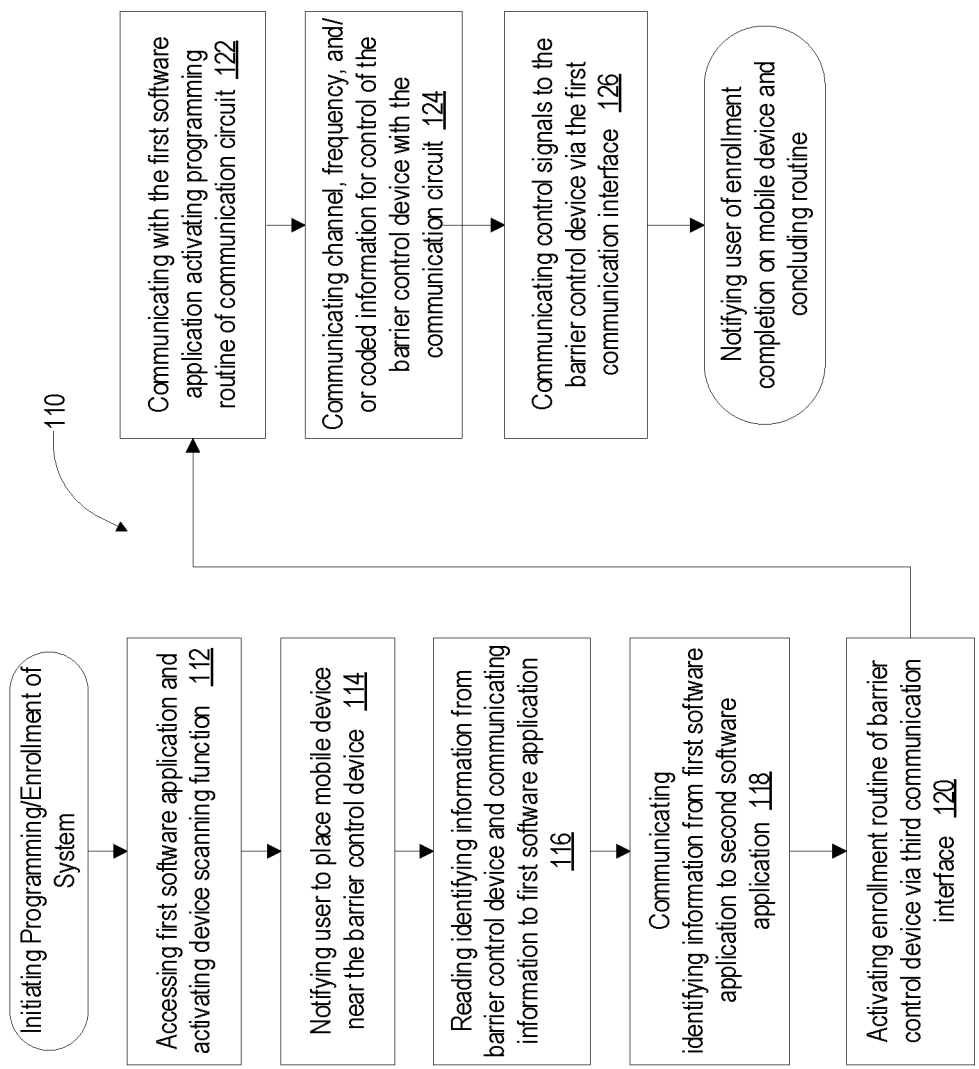
FIG. 6 is a flow chart demonstrating a method of programming an operation of a communication system to control a remote device.

FIG. 6 demonstrates a method 110 for programming the operation of the communication circuit 14 of the system to control the barrier control device 12a via the first communication interface 16. The method 110 is discussed in reference to FIGS. 2, 3, and 6 for clarity. In operation, the method 110 may utilize a short range wireless communication protocol (e.g. near field communication [NFC], radio frequency identification, etc.) communicated via the communication circuit 48 of the mobile device 18. The method may begin by accessing the first software application 18a to activate a device scanning function (112). Once activated, the first software application 18a may notify a user to place the mobile device 18 near the barrier control device 12a or a device associate with the barrier control device 12a (e.g., the original transmitter 17, a wired control button, etc.) (114). Once the mobile device 18 is within a range of the barrier control device 12a or the associated device, the communication circuit 48 may detect and read identifying information (Make/Model/SN) from barrier control device 12a and communicate the identifying information to the first software application 18a (116).

Once the identifying information of the barrier control device 12a is received by the first software application 18a, the first software application may communicate the identifying information to the second software application 18b (118). In response to receiving the identifying information, the second software application 18b may communicate with the remote server 32 and/or the barrier control device 12a via the third communication interface 22 and control the barrier control device 12a to activate an enrollment routine (120). Once the enrollment routine is activated, the second software application 18b may communicate with the first software application 18a to activate a programming routine of the communication circuit (122). The first software application 18a may then communicate channel, frequency, and/or coded information for control of the barrier control device 12a with the communication circuit 14 of the system 10 via the second communication interface 20 to activate the programming routine (124). Once activated, the programming routine may cause the communication circuit 14 of the system 10 to communicate control signals to the communication circuit 19 of the barrier control device 12a via the first communication interface 16 (126). Following the transmission of the control signal, the enrollment and programming of the communication circuit 14 to control the barrier control device 12a may be completed.

Figure 7:
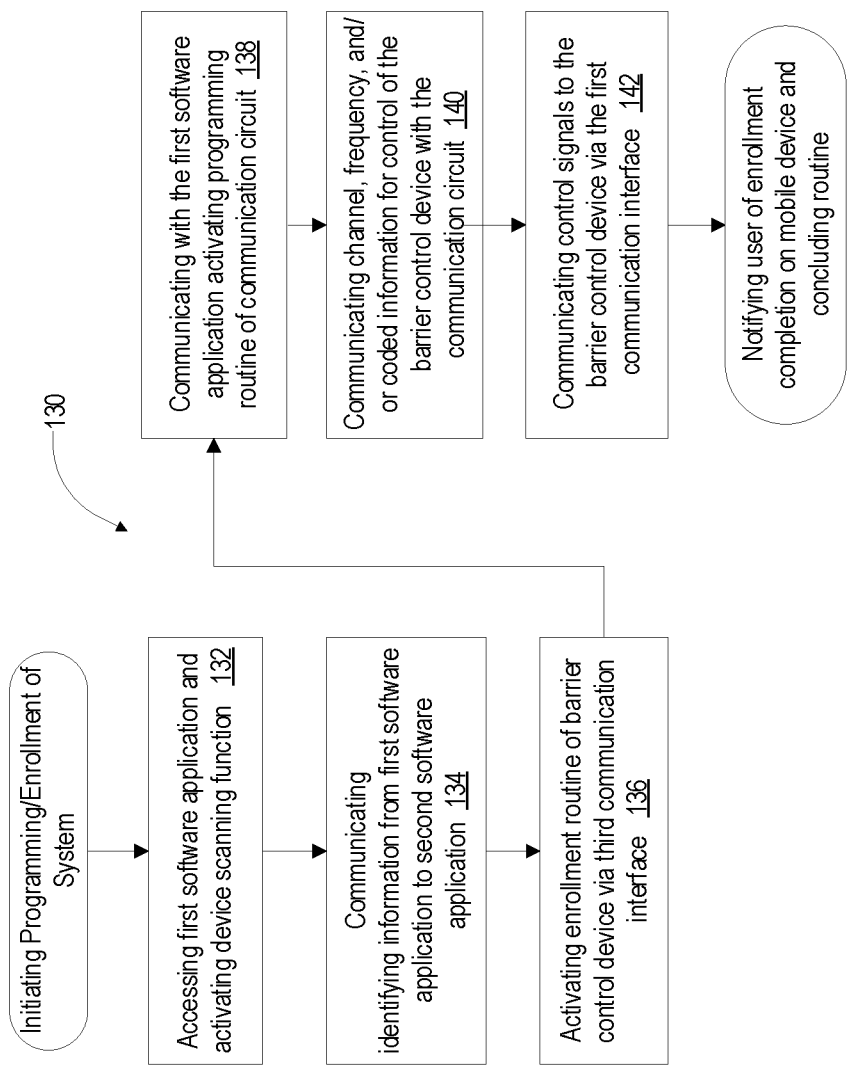
FIG. 7 is a flow chart demonstrating a method of programming an operation of a communication system to control a remote device.

FIG. 7 demonstrates a method 130 for programming the operation of the communication circuit 14 of the system to control the barrier control device 12a via the first communication interface 16. The method 130 is discussed in reference to FIGS. 2, 3, and 7 for clarity. In operation, the method 130 may utilize the camera system 66 of the mobile device 18 to read identifying information (Make/Model/SN) from barrier control device 12a. That is, the barrier control device 12a or a device associate with the barrier control device 12a (e.g., the original transmitter 17, a wired control button, etc.) may include a bar code, QR code, or other indicator of the identifying information of the barrier control device 12a. Accordingly, the method 130 may begin by accessing the first software application 18a to activate a device scanning function that may control the camera system 66 to capture image data depicting the identifying information (132). Once the identifying information of the barrier control device 12a is received by the first software application 18a, the first software application may communication the identifying information to the second software application 18b (134).

In response to receiving the identifying information, the second software application 18b may communicate with the remote server 32 and/or the barrier control device 12a via the third communication interface 22 and control the barrier control device 12a to activate an enrollment routine (136). Once the enrollment routine is activated, the second software application 18b may communicate with the first software application 18a to activate a programming routine of the communication circuit (138). The first software application 18a may then communicate channel, frequency, and/or coded information for control of the barrier control device 12a with the communication circuit 14 of the system 10 via the second communication interface to activate the programming routine (140). Once activated, the programming routine may cause the communication circuit 14 of the system 10 to communicate control signals to the communication circuit 19 of the barrier control device 12a via the first communication interface 16 (142). Following the transmission of the control signal, the enrollment and programming of the communication circuit 14 to control the barrier control device 12a may be completed.

Figure 8:
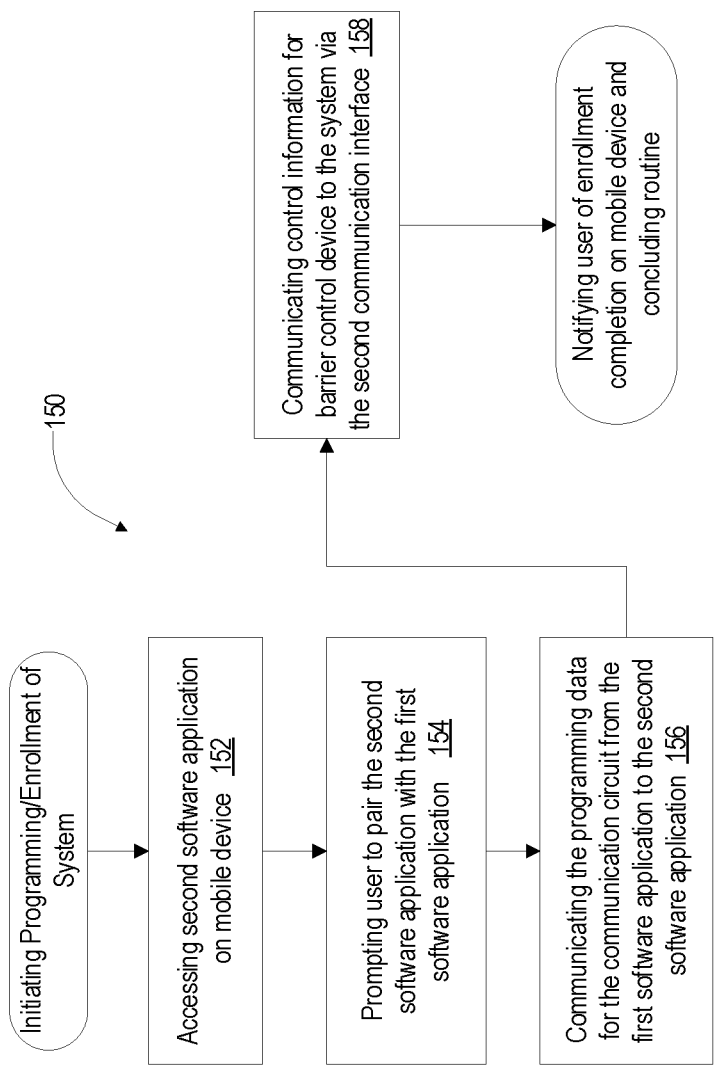
FIG. 8 is a flow chart demonstrating a method of programming an operation of a communication system to control a remote device.

FIG. 8 demonstrates a method 150 for programming the operation of the communication circuit 14 of the system to control the barrier control device 12a via the first communication interface 16. The method 150 is discussed in reference to FIGS. 2, 3, and 8 for clarity. In operation, the method 150 may begin by installing or accessing the second software application 18b on the mobile device 18 (152). In response to accessing the second software application 18b, the second software application 18b may control the user interface 57 to prompt a user of the device 18 to pair the second software application 18b with the first software application 18a (154). For example, the second software application 18b may prompt a user to download or access the first software application 18a. Accessing the first software application may require the user to log into a user account or create an account. Once accessed, the first software application 18a may be used as a gateway to communicate with the communication circuit 14 of the system 10 via the second communication interface 20, and the second software application 18b may serve as a gateway to communicate with the barrier control device 12a via the third communication interface 22. In this configuration, the first software application 18a and the second software application 18b may be configured to communicate programming information between the communication circuit 14 of the system 10 and the barrier control device 12a, respectively, in order to facilitate programming of the communication circuit 14.

Once the first software application 18a has been installed on the mobile device 18 and is accessible via the second software application 18b, the programming data for the communication circuit 14 may be communicated from the first software application 18a to the second software application 18b (156). Once the programming information is communicated between the software applications 18a, 18b, the first software application 18a may communicate the control information for the control of the barrier control device 12a to the system 10 via the second communication interface 20 (158). Accordingly, the method 150 may provide for the programming of the communication circuit 14 of the system 10 to be initiated by the second software application 18b.

Figure 9:
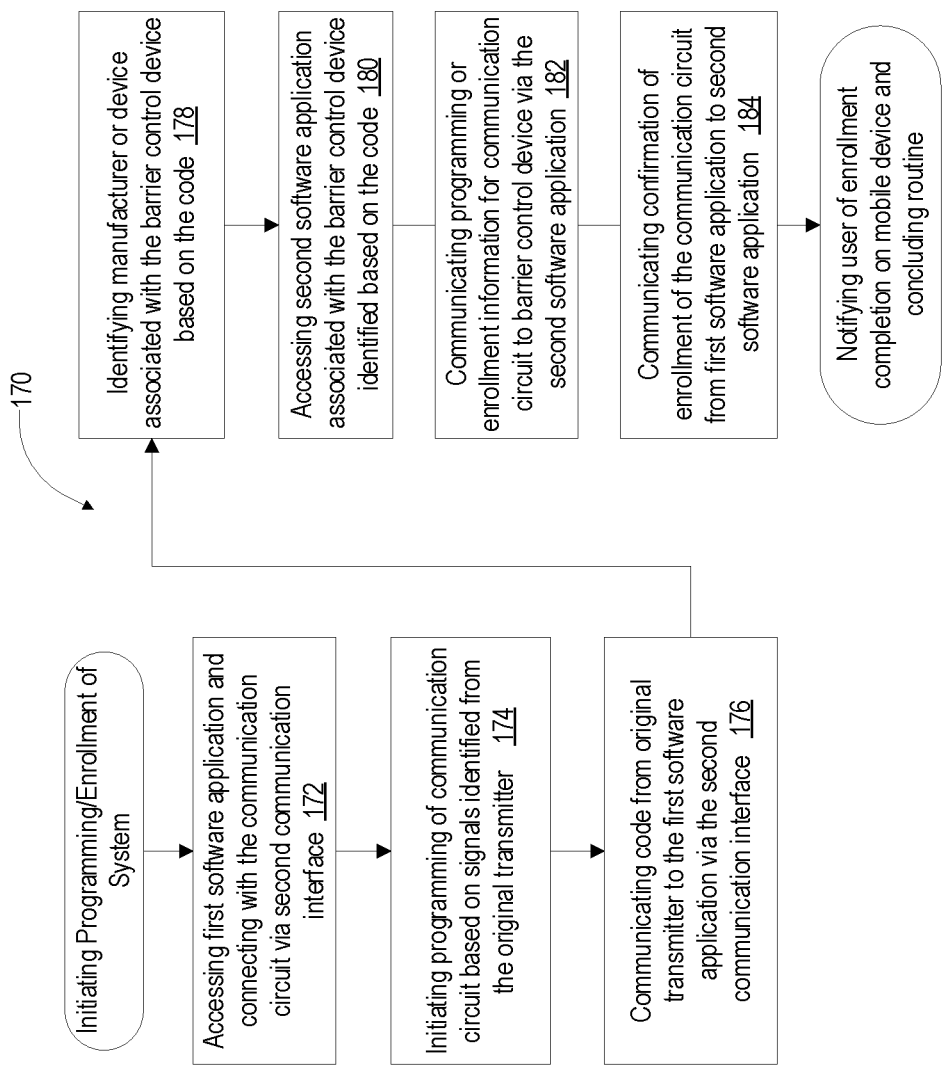
FIG. 9 is a flow chart demonstrating a method of programming an operation of a communication system to control a remote device in accordance with the disclosure.

FIG. 9 demonstrates a method 170 for programming the operation of the communication circuit 14 of the system to control the barrier control device 12a via the first communication interface 16. The method 170 is discussed in reference to FIGS. 2, 3, and 9 for clarity. The method 170 may begin by accessing the first software application 18a to connect with the communication circuit 14 of the system 10 via the second communication interface 20 (172). Once in communication with the system 10, the first software application 18a of the mobile device 18 may initiate the programming of the communication circuit 14 based on signals identified from the original transmitter 17 (174). That is, the first software application may instruct a user of the mobile device to activate the original transmitter 17 near or within range of the communication circuit 14, such that the system 10 may identify the code communicated by the original transmitter 17. Once the system 10 has identified the code from the original transmitter 17, the system 10 may communicate the code to the first software application 18a via the second communication interface 20 (176).

Once the code from the original transmitter 17 is received, the first software application 18a may identify a manufacturer or device associated with the barrier control device 12a based on the code (178). Such an identification may be determined by the system 10 and/or the mobile device 18 by comparing frequency or time varying signals of the coded transmission to coded information that is characteristic of or commonly associated with the manufacturer of the barrier control device 12a. In response to identifying the manufacturer or device of the barrier control device 12a, the first software application 18a may access or instruct the user to download the second software application 18b associated with the barrier control device 12a (180). Once available, the first software application 18a may communicate programming or enrollment information for the communication circuit 14 to the barrier control device 12a via the second software application 18b, which may communication via the third communication interface 22 (182). Once the programming of the communication circuit 14 is enrolled in the barrier control device 12a, second software application 18b may communicate a confirmation of the enrollment of the communication circuit 14 for control of the barrier control device 12a via the first communication interface 16 and the programming of the communication circuit 14 of the system may be completed (184).

The above description is considered that of the preferred embodiments only. Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

In this document, relational terms, such as first and second, top and bottom, front and back, left and right, vertical, horizontal, and the like, are used solely to distinguish one entity or action from another entity or action, without necessarily requiring or implying any actual such relationship, order, or number of such entities or actions. These terms are not meant to limit the element which they describe, as the various elements may be oriented differently in various applications. Furthermore, it is to be understood that the device may assume various orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

It will be understood that any described processes or steps within described processes may be combined with other disclosed processes or steps to form structures within the scope of the present disclosure. The exemplary processes disclosed herein are for illustrative purposes and are not to be construed as limiting. It is also to be understood that variations and modifications can be made on the aforementioned methods without departing from the concepts of the present disclosure, and further it is to be understood that such concepts are intended to be covered by the following claims unless these claims by their language expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within at least one of 2% of each other, 5% of each other, and 10% of each other.

What is claimed:

1. A communication module for a vehicle in communication with a mobile device via a first wireless interface, wherein the mobile device is further in communication with a remote server and configured to:
    access programming information for a remote device from the remote server via a second wireless interface;
    communicate the programming information with a communication circuit via a first software application configured to communicate with the communication module via a first communication interface;
    communicate the programming information with the remote server via a second software application configured to communicate with remote server via a third communication interface; and
    transfer the programming information between the first software application and the second software application on the mobile device, wherein the first software application is accessed via a first user account regulated by a first manufacturer and the second software application is accessed via a second user account regulated by a second manufacturer; and
    the communication module comprising:
    a trainable transmitter configured to communicate a radio frequency signal configured to control the remote device via a third wireless interface;
    the communication circuit configured to communicate with the mobile device via the first wireless interface;
    a user interface comprising at least one user input; and
    a controller configured to:
        communicate, with the remote server via the second wireless interface, the programming information for the remote device;

assign the programming information to the at least one user input in response to receiving the programming information; and control the trainable transmitter to output a control signal based on the programming information in response to receipt of an input on the at least one user input, wherein the control signal is configured to control the remote device.

2. The communication module according to claim 1, wherein the second wireless interface is a wireless communication network in communication with the remote server via an internet gateway.

3. The communication module according to claim 1, wherein the mobile device is further configured to identify identifying information of the remote device via at least one of a radio frequency identification (RFID) communication, a near field communication (NFC), and image data captured by a camera system of the mobile device.

4. The communication module according to claim 3, wherein the mobile device is further configured to:
communicate the identifying information identifying the remote device to the remote server via the second wireless interface; and
receive the programming information for the remote device based on the identifying information.

5. The communication module according to claim 1, wherein the remote device is configured to broadcast to a localized wireless communication network; and the mobile device is further configured to:
receive connection information for the localized wireless communication network via the second software application, wherein the second software application is configured to communicate with a remote server via the second wireless interface;
receive the programming information via the localized communication network broadcast from the remote device; and
communicate the programming information with the communication circuit via the first software application configured to communicate with the communication module via the first wireless interface.

6. A method of programming a communication module to control a remote device, comprising:
communicating, by a trainable transmitter, a radio frequency signal configured to control the remote device via a first communication protocol;
communicating, by a communication circuit, with a mobile device via a second communication protocol;
receiving, by a user interface, at least one user input on an input device;
communicating, by a controller, the programming information for the remote device to a remote server via the second communication protocol;
assigning, by the controller, the programming information to the at least one input device in response to receiving the programming information;
controlling, by the controller, the trainable transmitter to output a control signal based on the programming information in response to the receipt of the at least one user input on the input device, wherein the control signal is configured to control the remote device communicating, by the mobile device, the programming information to the remote server via a third communication protocol;
initiating a first communication of the programming information with the communication circuit via a first software application via the second communication protocol, wherein the first software application comprises first control features that adjust one or more first operating configurations of the communication module regulated by a first manufacturer;
initiating a second communication of the programming information with the remote server via a second software application via the third communication protocol, wherein the second software application comprises second control features that adjust one or more second operating configurations of the remote device regulated by a second manufacturer; and
transferring the programming information between the first software application and the second software application on the mobile device, wherein the first software application is accessed via a first user account regulated by the first manufacturer and the second software application is accessed via a second user account regulated by the second manufacturer.

7. The method of claim 6, wherein the third communication protocol is a wireless communication network in communication with the remote server via an internet gateway.

8. The method of claim 6, further comprising identifying, by the mobile device, identifying information of the remote device via at least one of a radio frequency identification (RFID) communication, a near field communication (NFC), and image data captured by a camera system of the mobile device.

9. The method of claim 7, further comprising communicating, by the mobile device, identifying information for the remote device to the remote server via the third communication protocol; and
receiving, by the mobile device, the programming information for the remote device based on the identifying information.

10. The method of claim 9, further comprising broadcasting, by the remote device, to a localized wireless communication network, and
receiving, by the remote device, connection information for the localized wireless communication network via the second software application, wherein the second software application is configured to communicate with the remote server via the third communication protocol.

11. The method of claim 10, further comprising receiving, by the remote device, programming information via the localized communication network broadcast from the mobile device.

12. The method of claim 11, further comprising communicating, by the remote device, the programming information with the communication circuit via the first software application configured to communicate with the communication module via the first communication protocol.

13. The communication module according to claim 1, wherein the first user account requires different security access or user credentials than the second user account for access via the mobile device.

* * * * *